March 1, 1966  A. J. BEHRINGER ET AL  3,238,150
PHOTOCONDUCTIVE CADMIUM SULFIDE POWDER AND METHOD
FOR THE PREPARATION THEREOF Filed Sept. 12, 1962

2 Sheets-Sheet 1

INVENTOR.
ARTHUR J. BEHRINGER
LESTER CORRSIN
BY

ATTORNEY

United States Patent Office 3,238,150
Patented Mar. 1, 1966

3,238,150
PHOTOCONDUCTIVE CADMIUM SULFIDE POWDER AND METHOD FOR THE PREPARATION THEREOF
Arthur J. Behringer, Webster, and Lester Corrsin, Penfield, N.Y., assignors to Xerox Corporation, Rochester, N.Y., a corporation of New York
Filed Sept. 12, 1962, Ser. No. 223,208
5 Claims. (Cl. 252—501)

This invention relates to cadmium sulfide photoconductors: to improved methods of preparing cadmium sulfide photoconductors, improved cadmium sulfide photoconductors, improved cadmium sulfide photocells, and improved xerographic plates incorporating cadmium sulfide photoconductors.

Cadmium sulfide is a well-known photoconductor which is highly sensitive to light and which is sensitive to wave lengths extending into the infrared region of the spectrum. As is generally true with most photoconductors, semiconductors, etc., the desired properties are not usually found to any great extent in commercially available materials and special methods of preparation must be employed. A useful method of preparing photoconductive cadmium sulfide has been described in U.S. Patent 2,876,202, particularly as exemplified in the first and principal example of that patent. Broadly speaking, the patent contempla'es mixing commercially available cadmium sulfide with a cadmium chloride flux and doping agents and subjecting the cadmium sulfide to three separate firing operations.

In accordance with the present invention, however, it has been found that through the use of a zinc chloride flux, it is possible to prepare photoconductive cadmium sulfide by a process involving two firing steps only and that a photoconductive material of highly useful properties is formed thereby. It has also been found that xerographic plates of highly useful properties can be made which incorporate the cadmium sulfide of the invention.

Figure 1:
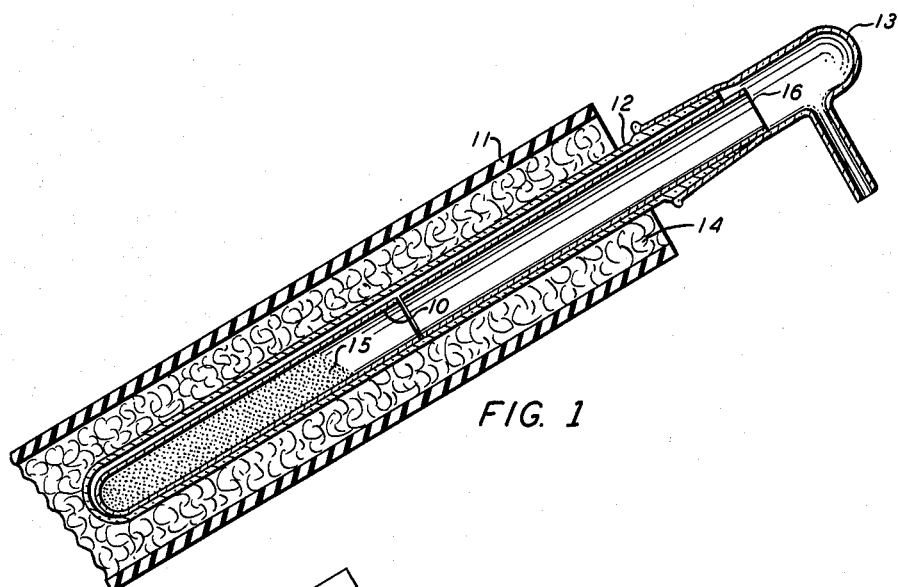
Figure 2:
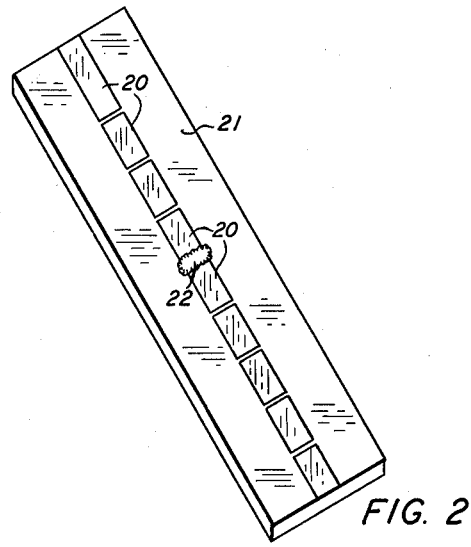
Figure 3:
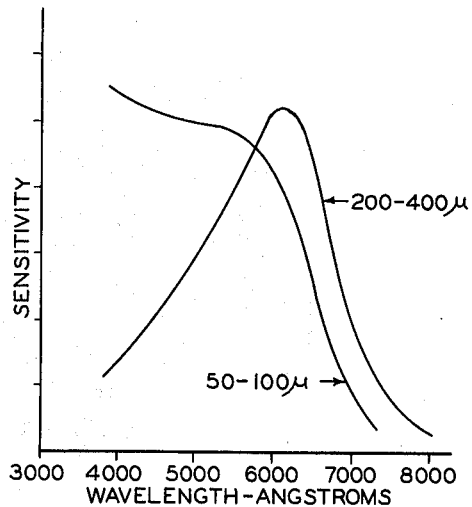
Figure 4:
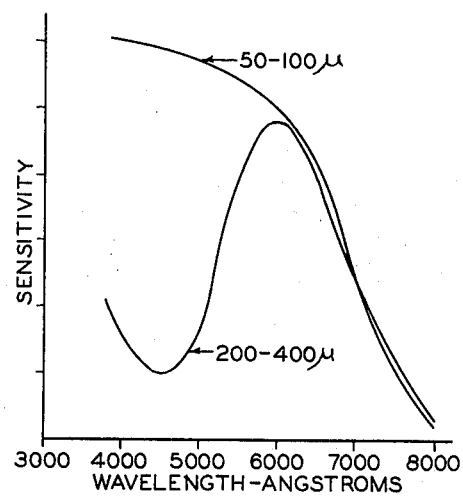
Figure 5:
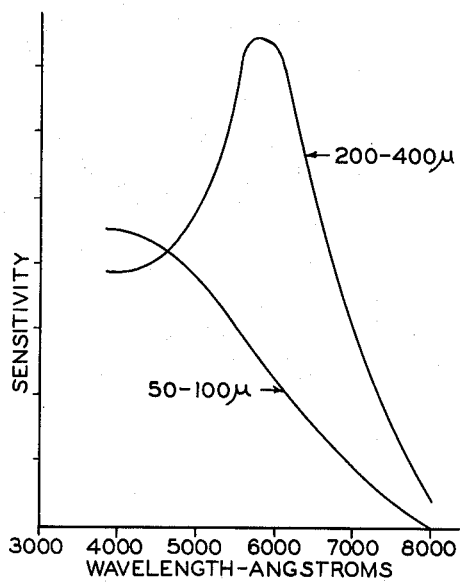
Figure 6:
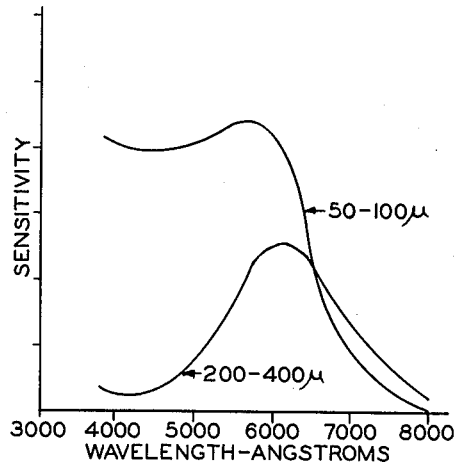

The various objects of the invention will become apparent from the following description and from the drawings in which FIGURE 1 is a sectional view of apparatus useful in carrying out the invention, FIGURE 2 is a perspective view of a device used in testing the invention, and FIGURES 3, 4, 5 and 6 show the spectral sensitivity curves of various cadmium sulfide xerographic plates.

As noted above, the conventional method of preparing photoconductive cadmium sulfide involves three separate firing operations. The first of these is generally intended to recrystallize the powder with simultaneous incorporation of either copper or silver and a substantial amount of chloride into the host crystals. The second firing step enhances the photoconductivity by incorporating additional halide but leaves the dark conductivity excessively high. The third firing in a sulfur atmosphere then reduces the dark conductivity without substantially reducing the light conductivity. In accordance with the present invention, however, the photoconductive properties including low dark conductivity are substantially fully developed after the second firing operation.

EXAMPLE 1

In accordance with a preferred embodiment of the invention a paste-like blend of cadmium sulfide, zinc chloride flux and copper as cupric chloride was prepared consisting of the following proportions: 50 gm. CdS plus 15 ml. of an aqueous solution containing 5.0 gm. $ZnCl_2$, 0.5 $NH_4Cl$ and 13.5 mg. $CuCl_2$—$2H_2O$ (equivalent to 5.0 mg. copper). The cadmium sulfide was a luminescent grade obtained from the General Electric Company. The mixed slurry was then transferred to a Petri dish and dried in an oven at 140° C. for a few hours. The dry cake was broken up into small chunks and transferred to an 18 cm. long by 22 mm. inside diameter quartz tube 10 such as shown in FIG. 1. The quartz tube was then inserted into a tubular furnace 11 lined with a 36 cm. long by 26 mm. inside diameter Vycor tube 12 which projected outside the furnace and was covered by a vented Vycor cap 13. A glass tube 16 served as an extension to quartz tube 10. The furnace was packed with steel wool 14 and maintained at a temperature of 600 C. as measured by a thermocouple (not shown) placed against the outside wall of the Vycor tube 12. A thermocouple placed inside quartz tube 10 during a trial run registered the same temperature as the one outside the Vycor tube 12. The powder 15 was fired in tube 10 in an atmosphere of chloride and stagnant air for a period of 20 minutes at 600° C. after a time interval of 20 minutes for the sample to reach this temperature. During the firing period the Vycor cap 13 was on the mouth of the tube. After firing for the specified period the quartz tube 10 was removed from the furnace and allowed to cool to room temperature upon standing. The resulting product was washed free of the water soluble flux using dionized or distilled water, dried and sieved through a 325 mesh screen which removed any particles or agglomerates larger than 45 microns. The sieved powder was then moistened with an aqueous 0.1M $ZnCl_2$, 1.0M $NH_4Cl$ solution and again dried as described above. The powder was again sieved through a 325 mesh screen and again placed in quartz tube 10. The powder was fired a second time in the same manner as for the first firing operation mentioned above, i.e., fired for 20 minutes at a temperature of 600° C. in a stagnant atmosphere of air. The product obtained from this second firing was sieved through a 60 mesh screen and gently broken down into a fine powder without any grinding being required.

Except as otherwise specified the procedures in this and subsequent examples are similar to those set forth in somewhat greater detail in U.S. Patent 2,876,202, Example 1. The powder obtained from the foregoing procedure is a satisfactory photoconductor with good light sensitivity and dark resistivity and requires no further processing. It is noticeably finer and noticeably lighter in color than the product obtained by substantially fully conforming to the procedure of the patent as in Example 7 below.

EXAMPLE 2

The aqueous solution of zinc chloride, ammonium chloride, and copper chloride employed in Example 1 was colloidal or cloudy. In this example approximately 12 drops of concentrated hydrochloric acid were added to the solution to clear it. All other procedures were exactly the same as in Example 1.

EXAMPLE 3

In this example the procedures of the patent, including the use of cadmium chloride flux, were followed in all respects except that only the first firing step was carried out.

EXAMPLE 4

In this example zinc chloride flux was employed as in Example 1 but only one firing step was carried out.

EXAMPLE 5

In this example the procedure of Example 2 was followed except that only one firing step was carried out.

EXAMPLE 6

This example is the same as Example 1 except that cadmium chloride flux was employed.

EXAMPLE 7

This corresponds in all respects to Example 1 of the patent. Cadmium chloride flux was employed and three separate firing steps were carried out. After the second firing step about 50 milligrams of sulfur was placed in the bottom of a Pyrex tube 12 mm. inside diameter and 10 grams of powder from the second firing was placed on top of the sulfur. The powders were fired at 500° C. for 10 minutes and then fired for 10 additional minutes at the same temperature under reduced pressure conditions of about 50 microns mercury to remove excess sulfur. The powder was then cooled to room temperature and finally sieved through a 325 mesh screen.

EXAMPLE 8

This was the same in all respects as Example 7 except that zinc chloride flux was employed together with 12 drops of hydrochloric acid.

A device for measuring the lateral photoconductive characteristics of the powders prepared as described in the above examples is shown in FIG. 2. Strips of conductive tin oxide 20 were etched from a conductive tin oxide-coated glass test plate 21 using zinc powder plus concentrated hydrochloric acid. "Scotch" tape No. 810 was found effective as a masking tape to protect the tin oxide from the etching process. The tin oxide was etched off in such a manner that a 5.0 mm. strip of the tin oxide material remained having 0.5 mm. transverse gaps spaced about 10 mm. apart. The powder to be tested was mixed in a 1:1 by volume ratio with a 1% ethyl cellulose-toluene solution. A drop of this slurry was placed over any one of the 0.5 mm. gaps on the test plate 21 and dried to form photoconductive layer 22. The concentration of the ethyl cellulose binder in the photoconductive layer 22 is approximately ½%. Each of the resulting cells was tested at a voltage of 300 volts and with approximately 1 foot candle of illumination from an incandescent lamp. Table 1 shows the results of current measurements on each of the eight photocells prepared from the eight examples given above. The first column of current values gives the initial light conductivity $i_L$ in amperes. The next column gives the dark conductivity $i_D$ after five minutes of darkness and the next column gives the light conductivity $i_L$ as measured one minute after the illumination is turned on for a second time following the dark period. The last column $i_3$ gives the current as measured 3 seconds after the illumination is turned on for a second time following the dark period.

*Table 1*

| Example | Flux; No. Steps | Init. $i_L$ | $i_D$ | $i_L$ | $i_3$ |
| --- | --- | --- | --- | --- | --- |
| 1 | ZnCl$_2$; 2 | 1.4×10$^{-5}$ | 2.9×10$^{-10}$ | 1.8×10$^{-5}$ | 1.0×10$^{-5}$ |
| 2 | ZnCl$_2$ and HCl; 2 | 3.0×10$^{-5}$ | 2.2×10$^{-10}$ | 4.0×10$^{-5}$ | 2.5×10$^{-5}$ |
| 3 | CdCl$_2$; 1 | 3.5×10$^{-5}$ | 4.8×10$^{-7}$ | 4.5×10$^{-5}$ | 3.0×10$^{-5}$ |
| 4 | ZnCl$_2$; 1 | 6.0×10$^{-8}$ | 3.6×10$^{-10}$ | 1.2×10$^{-7}$ | 8.0×10$^{-8}$ |
| 5 | ZnCl$_2$ and HCl; 1 | 2.0×10$^{-8}$ | 3.3×10$^{-10}$ | 5.0×10$^{-8}$ | 2.0×10$^{-8}$ |
| 6 | CdCl$_2$; 2 | 1.0×10$^{-4}$ | 2.0×10$^{-7}$ | 1.2×10$^{-4}$ | 1.0×10$^{-4}$ |
| 7 | CdCl$_2$; 3 | 2.4×10$^{-5}$ | 3.6×10$^{-10}$ | 3.0×10$^{-5}$ | 1.6×10$^{-5}$ |
| 8 | ZnCl$_2$ and HCl; 3 | 3.4×10$^{-6}$ | 1.4×10$^{-10}$ | 6.0×10$^{-6}$ | 3.0×10$^{-6}$ |

It can be seen from the table that the material prepared with a cadmium chloride flux requires the complete process of three firing steps, since the dark current after the second step is unacceptably high and is three orders of magnitude larger than that obtained after the third firing step. It can also be seen that the material fired with zinc chloride flux has, after the second firing step, properties which are similar to or better than those of the cadmium chloride material after the full three step process. It also can be seen that when the zinc chloride flux is used, a third firing step is not only unnecessary but is, in fact undesirable since it reduces the light conductivity by an order of magnitude without substantially improving the dark conductivity. It can also be seen from the table that no major change results from the use of hydrochloric acid in conjunction with the zinc chloride flux but that the light conductivity is somewhat improved.

Cadmium sulfide photoconductors are useful not only in photocells and the like but have been found useful in preparing xerographic plates. As is well known, a xerographic plate is a structure which is useful for the electrostatic reproduction of images and which is capable of retaining an electrostatic surface charge in darkness and selectively dissipating that charge when exposed to a light pattern to form an electrostatic latent image.

Xerographic plates made from high quality cadmium sulfide photoconductors have been found useful because of their high sensitivity and high panchromaticity compared to other xerographic plates and because they have a dark resistivity which is adequate for many purposes.

Xerographic plates were successfully made from the materials prepared in Examples 1, 2, 7 and 8 above. In each case the photoconductive pigment was mixed with a 60 percent solids silicone resin solution in the ratio of 2 grams of powder per milliliter of silicone solution. The silicone solution is identified as SR-82, a silicone resin solution obtainable from the General Electric Company. Each of these mixtures was coated onto transparent conductive tin oxide coated glass substrates in two different thicknesses. The thinner coating, in each case, ranged between 50 and 100 microns in thickness and the thicker coating between 200 and 400 microns in thickness. These xerographic plates were then electrostatically charged by corona to a negative potential and their surfaces were exposed to light of various wave lengths at a constant photon intensity of $3.4 \times 10^{11}$ photons per cm.$^2$ per second to determine the spectral rate of potential decay for each of the plates. The sensitivity as recorded in FIGURES 3, 4, 5 and 6 was computed as the voltage decay under illumination in volts per second less the dark voltage decay in volts per second, multiplied by a constant factor. In each case the sensitivity was measured at a potential 350 volts above the minimum potential to which the plate could be discharged. This minimum potential varied between 5 and 20 volts. FIGURES 3, 4, 5 and 6 show the measurements obtained with the materials of Examples 7, 1, 2 and 8, respectively, and drawn to a common scale. In each figure, it will be noted that the shape of the curve for the thin and thick samples of a given material are quite different. The thicker samples show increased sensitivity at long wave lengths because more of the incident light is absorbed. However, they also show reduced sensitivity at short wave lengths because all the incident radiation is absorbed at the very surface of the photoconductive layer and the thickness of the layer is too great to permit all of the charge carriers liberated by the incident light to traverse the full thickness of the film. It can be seen from these figures that a xerographic plate incorporating cadmium sulfide prepared in accordance with a preferred embodiment of the invention such as that of Example 1, or particularly Example 2, is comparable in sensitivity to that prepared from prior art material, such as Example 7, and is actually somewhat more sensitive. It can also be seen from FIGURE 6 (Example 8) that through the use of the zinc sulfide flux of the present invention, a three-step method of preparation is neither necessary nor desirable. Although the xerographic plates in this series of experiments were made with a particular resin binder and a particular pigment to binder ratio, it will be understood that various electrically insulating film forming materials and techniques are known for incorporating photoconductive powders into a xerographic plate and any of them may be used in accordance with the present invention to form cadmium sulfide bearing xerographic plates of superior properties.

Although the photoconductive pigment of the invention has been referred to throughout as cadmium sulfide, it is likely that it actually contains a certain amount of zinc sulfide as a result of chemical exchange during the recrystallization from the zinc chloride flux during the first firing. In particular, it is believed that each photoconductor-particle has a surface layer enriched in zinc sulfide, which has a larger band gap and impurity ionization energy than pure cadmium sulfide. One can theorize that this would tend to increase the resistivity of the particle surface, which has been shown to be an important factor controlling the resistivity of binder plates. The third firing step to increase the resistance of the particle surface then becomes unnecessary and undesirable. It is also pertinent that zinc chloride melts at 262° C. and boils at 732° C. while cadmium chloride melts at 568° C. and boils at 960° C. The higher vapor pressure of the zinc chloride flux at normal firing temperatures may be at least partly responsible for the finer particle size and other benefits of the invention. This theoretical explanation is admittedly speculative, but the advantages and benefits of the invention are real and independent of the validity of any theory.

Although the invention has been described in terms of particular materials, apparatus, doping agents, particular formulas, times, temperatures, and the like, it should be understood that this was for the purpose of providing a specific preferred and illustrative embodiment of the invention rather than for purposes of limitation. Thus, substantial variations may be made from the described embodiments without departing from the spirit of the invention and without sacrificing the advantages and benefits conferred by the invention.

What is claimed is:

1. A method of preparing photoconductive cadmium sulfide powder in only two firing steps comprising:
    (a) firing a mixture of cadmium sulfide powder with activator proportions of copper and a halogen in about 1 part by weight of a zinc chloride flux to about 10 parts by weight of cadmium sulfide at about 600° C. for about 20 minutes,
    (b) washing the resulting material with deionized water to remove water soluble materials, and
    (c) refiring the washed product at about 600° C. for about 20 minutes after wetting said product with a 0.1 M aqueous solution of zinc chloride.

2. A method according to claim 1 further including adding about 12 drops of hydrochloric acid to each 100 parts by weight of cadmium sulfide powder prior to said first firing step.

3. A photoconducting cadmium sulfide powder prepared by the method of claim 1.

4. A method for preparing a photoconductive cadmium sulfide powder in only two firing steps which comprises:
    (a) firing a mixture comprising 100 parts by weight of powdered cadmium sulfide, 10 parts by weight of zinc chloride, 1 part by weight of ammonium chloride, and .0001 part by weight of copper as copper chloride to about 600° C. for about 20 minutes,
    (b) washing said fired product to remove water-soluble materials, and
    (c) refiring said washed product with a trace of zinc chloride at about 600° C. for about 20 minutes.

5. A method for preparing a photoconductive cadmium sulfide powder in only two firing steps which comprises:
    (a) firing a mixture comprising 100 parts by weight of cadmium sulfide, 10 parts by weight of zinc chloride, 1 part by weight of ammonium chloride, 12 drops of hydrochloric acid, and .0001 part by weight of copper as copper chloride to about 600° C. for about 20 minutes.
    (b) washing said fired product to remove water-soluble materials, and
    (c) re-firing said washed product with a trace of zinc chloride at about 600° C. for about 20 minutes.

References Cited by the Examiner
UNITED STATES PATENTS

| | | | |
|---|---|---|---|
| 2,765,385 | 10/1956 | Thomsen | 252—501 XR |
| 2,803,542 | 8/1957 | Ullrich | 252—501 XR |
| 2,866,878 | 12/1958 | Briggs et al. | 252—501 XR |
| 2,876,202 | 3/1959 | Busanovich et al. | 252—501 |
| 2,986,534 | 5/1961 | Beutler | 252—501 |

JULIUS GREENWALD, *Primary Examiner.*

ALBERT T. MEYERS, *Examiner.*